(12) United States Patent
Wang et al.

(10) Patent No.: US 7,167,276 B2
(45) Date of Patent: Jan. 23, 2007

(54) DATA CONVERSION BETWEEN COLOR COORDINATE SYSTEMS

(75) Inventors: Rong Wang, San Jose, CA (US); John S. Haikin, Fremont, CA (US); Todd D. Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1019 days.

(21) Appl. No.: 10/274,895

(22) Filed: Oct. 22, 2002

(65) Prior Publication Data

US 2004/0075852 A1 Apr. 22, 2004

(51) Int. Cl.
*G06F 3/12* (2006.01)

(52) U.S. Cl. ............... 358/1.9; 358/518; 358/519; 358/520; 358/525; 345/590; 345/591; 345/600; 345/601; 345/604

(58) Field of Classification Search ............... 358/1.9, 358/518, 519, 520, 525; 345/590, 591, 600, 345/601, 604
See application file for complete search history.

(56) References Cited

U.S. PATENT DOCUMENTS

| | | | |
|---|---|---|---|
| 5,309,258 A * | 5/1994 | Kouno et al. ............... 358/523 |
| 5,519,401 A | 5/1996 | Farmer et al. ............... 342/185 |
| 5,860,925 A | 1/1999 | Liu ............... 600/443 |
| 5,904,652 A | 5/1999 | Gilbert et al. ............... 600/447 |
| 6,125,304 A | 9/2000 | Suzuki ............... 700/182 |
| 6,151,136 A * | 11/2000 | Takemoto ............... 358/1.9 |
| 6,279,393 B1 | 8/2001 | McLaughlin ............... 73/170.14 |
| 6,345,117 B1 | 2/2002 | Klassen ............... 382/167 |
| 6,408,109 B1 | 6/2002 | Silver ............... 382/300 |
| 6,778,185 B1 * | 8/2004 | Moroney ............... 345/590 |
| 6,894,806 B1 * | 5/2005 | Woolfe et al. ............... 358/1.9 |

\* cited by examiner

*Primary Examiner*—Twyler Lamb
*Assistant Examiner*—Vu B. Hang
(74) *Attorney, Agent, or Firm*—Fitzpatrick, Cella, Harper & Scinto

(57) ABSTRACT

Conversion of color data values from a rectangular coordinate system such as CIELab to a cylindrical coordinate system such as CIELCh using two one-dimensional look-up tables, one each for the C value and the h value. The one-dimensional look-up tables are accessed by defining a new variable γ as the absolute value of the ratio of b and a.

11 Claims, 9 Drawing Sheets

C QUADRANT RESOLUTION

| |a| > |b|<br>(0 > γ < 1.0) | |a| < |b|<br>(γ > 1.0) |
|---|---|
| $C = |a| * (1.0 + \gamma^2)^{\frac{1}{2}}$<br>$= |a| * f(\gamma)$ | $C = |b| * (1.0 + (1/\gamma)^2)^{\frac{1}{2}}$<br>$= |b| * f(1/\gamma)$ |

FIG. 6 h OCTANT RESOLUTION

| | b = 0 | b > 0, γ > 1 | b > 0, γ ≤ 1 | b < 0, γ > 1 | b < 0, γ ≤ 1 |
|---|---|---|---|---|---|
| a = 0 | undefined, use 0° | 90° | N/A | 270° | N/A |
| a > 0 | 0° | 90° − H(1/γ) | H(γ) | 270° + H(1/γ) | 360° − H(γ) |
| a < 0 | 180° | 90° + H(1/γ) | 180° − H(γ) | 270° − H(1/γ) | 180° + H(γ) |

FIG. 7

C, h CONVERSION FOR a = 0

|   | b = 0 | b > 0 | b < 0 |
|---|---|---|---|
| a = 0 | C = 0<br>H = 0° | C = b<br>H = 90° | C = -b<br>H = 270° |

FIG. 9A

C, h CONVERSION FOR a > 0

|   | b = 0 | b > 0,<br>b > a | b > 0,<br>b ≤ a | b < 0,<br>-b > a | b < 0,<br>-b ≤ a |
|---|---|---|---|---|---|
| a > 0 | C = a<br>h = 0° | $C = b \cdot f(\frac{a}{b})$<br>$h = 90° - H(\frac{a}{b})$ | $C = a \cdot f(\frac{b}{a})$<br>$h = H(\frac{b}{a})$ | $C = -b \cdot f(-\frac{a}{b})$<br>$h = 270° + H(-\frac{a}{b})$ | $C = a \cdot f(-\frac{b}{a})$<br>$h = 360° - H(-\frac{b}{a})$ |

FIG. 9B

C, h CONVERSION FOR a < 0

|   | b = 0 | b > 0,<br>b > -a | b > 0,<br>b ≤ -a | b < 0,<br>-b > -a | b < 0,<br>-b ≤ -a |
|---|---|---|---|---|---|
| a < 0 | C = -a<br>h = 180° | $C = b \cdot f(-\frac{a}{b})$<br>$h = 90° + H(-\frac{a}{b})$ | $C = -a \cdot f(-\frac{b}{a})$<br>$h = 180° - H(-\frac{b}{a})$ | $C = -b \cdot f(\frac{a}{b})$<br>$h = 270° - H(\frac{a}{b})$ | $C = -a \cdot f(\frac{b}{a})$<br>$h = 180° + H(\frac{b}{a})$ |

FIG. 9C

DATA CONVERSION BETWEEN COLOR COORDINATE SYSTEMS

BACKGROUND OF THE INVENTION

1. Field of the Invention

The present invention relates to conversion of a color data value in a rectangular color coordinate system such as CIELab color coordinate system to a corresponding color data value in a cylindrical or polar coordinate system such as CIELCh coordinate system, and to in particular the use of one-dimensional look-up tables to facilitate the conversion.

2. Description of the Related Art

Recent efforts in implementation of color science into computer software have resulted in increasingly sophisticated and accurate applications, particularly at the consumer level. Correspondingly, end users of the software have increased expectations as to the accuracy and fidelity of color data reproduced thereby. For example, it is now commonplace for users to expect a color management system to accurately processes computerized color data such as color image data so as to maintain fidelity of the color data over a wide variety of viewing environments, and over a wide variety of output devices.

As a result of these increased expectations by users and the increased sophistication of applications, it is common for such applications to engage in significant manipulation of color data. One frequently encountered manipulation involves a transformation of color data from a rectangular coordinate system such as CIELab to cylindrical or polar coordinates such as CIELCh. For example, there are some manipulations such as gamut matching or mapping which is performed more easily and/or more accurately in cylindrical CIELCh coordinates, whereas there are other manipulations such as forward- and reverse-transforms based on device profiles that are better performed in rectangular coordinates such as CIELab.

Mathematically, the conversion of data values between CIELab and CIELCh coordinates involves the following equations (hereinafter, CIELab will be used as a representative example of rectangular coordinates and CIELCh will be used as a representative example of cylindrical or polar coordinates:

L=L $$L = L$$
$$C = \sqrt{a^2 + b^2} \quad (1)$$
$$h = \arctan\frac{b}{a} \quad (2)$$

These equations are computationally costly, particularly since the equations must be evaluated for each and every pixel in a color image. Other techniques have therefore been considered for evaluation of these equations in a less costly manner.

One such technique involves use of two-dimensional look-up tables, a first look-up table to evaluate the "C" value of equation (1) above, and a second look-up table to look up the "h" value in equation (2) above. Since each of these values depends on the "a" and "b" coordinates, a two-dimensional look-up table is required for each of equations (1) and (2).

This approach has significant disadvantages, particularly for look-up tables of reasonable size. For example, with a two-dimensional look-up table of 32×32 grid size, which requires 1,024 entries, an unacceptably large error value of nearly 10 degrees is obtained for the "h" value of equation (2). Although interpolation can help reduce this error, the error is still significant for table values of reasonable size, resulting in correspondingly significant color inaccuracies.

SUMMARY OF THE INVENTION

The present invention addresses the foregoing disadvantage of two-dimensional look-up tables by instead employing one-dimensional look-up tables that are indexed with a single input parameter $\gamma$, where $\gamma$ is defined as the absolute value of the ratio of the a and b coordinates, such as:

$$\gamma = \left|\frac{b}{a}\right| \quad (3)$$

Thus, in one aspect, the invention involves conversion of a color data value (a, b) in rectangular coordinates to a corresponding color data value (c, h) in polar coordinates, in which a variable, $\gamma$, is calculated as the absolute value of the ratio of b and a. For example, a first one-dimensional look-up table is accessed using the $\gamma$ value to obtain a first look-up value, with the first one-dimensional look-up table implementing the values $\sqrt{1+\gamma^2}$ for values of $\gamma$ in the range [0 to 1]. The first look-up value is ambiguous with respect to the diagonal quadrant of the C value, and the diagonal quadrant is therefore resolved based on the ratio $\gamma$, after which the value of C is calculated based on the resolved diagonal quadrant and the first look-up value. The diagonal quadrants are formed by the orthogonal lines defined by a=b and by a=(−b). A second one-dimensional look-up table is accessed so as to obtain a second look-up value, with the second look-up table implementing the values of arctan ($\gamma$) on the range [0 to 1]. The second look-up value is ambiguous with respect to the octant for the value h, and the octant is therefore resolved based on the values of a and b and further based on the ratio $\gamma$. Thereafter, the h value is calculated based on the resolved octant and the second look-up value.

Because the invention defines a ratio $\gamma$ of the b and a values, one-dimensional look-up tables can be used (one for each of the "C" and the "h" coordinates), instead of the previously required two-dimensional tables. Moreover, because a one-dimensional table is used, a table with the same number of entries as the previously required two-dimensional table can yield results of much greater accuracy. For example, with respect to the aforementioned 32×32=1,024 entry table, a one-dimensional look-up table with nearly the same number of entries (n=1,000) can yield an acceptably small error for h of $10^{-5}$ degrees.

In more specific aspects of the invention, the ratio $\gamma$ is defined differently based on the relative values of a and b, so that in some circumstances $\gamma$=b/a and in other circumstances $\gamma$=a/b. Alternatively, $\gamma$ can be consistently defined as $\gamma$=|a/b| (or |b/a|), with the look-up tables being accessed based on either $\gamma$ or 1/$\gamma$ depending on the size of $\gamma$. Moreover, when resolving the diagonal quadrant for C and the octant for h, special cases can be defined for particular values of a and b, so as to avoid singularities (such as arctan (90°)) and undefined conditions (such as a=b=0).

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 6 is a table for determining the use of a one-dimensional look-up table to calculate the C coordinate of LCh according to one embodiment of the invention.

FIG. 7 is a table for determining the use of a one-dimensional look-up table to calculate the h coordinate of LCh according to one embodiment of the invention.

FIGS. 9A, 9B, and 9C are tables for determining the use of a one-dimensional look-up tables to calculate the C and h coordinates of LCh according to another embodiment of the invention.

DETAILED DESCRIPTION OF THE PREFERRED EMBODIMENTS

The present invention utilizes one-dimensional look-up tables for the conversion of a color data value in a rectangular color coordinate system, such as CIELab color coordinate system, to a corresponding color data value in a cylindrical or polar coordinate system, such as CIELCh coordinate system. The use of one-dimensional look-up tables for the conversion allows for precise and efficient conversion of image data, thereby conserving computing resources, such as computational processing time and memory. In one embodiment discussed below, the present invention is particularly useful in converting color image data coordinates during color management of color image data.

Figure 1:
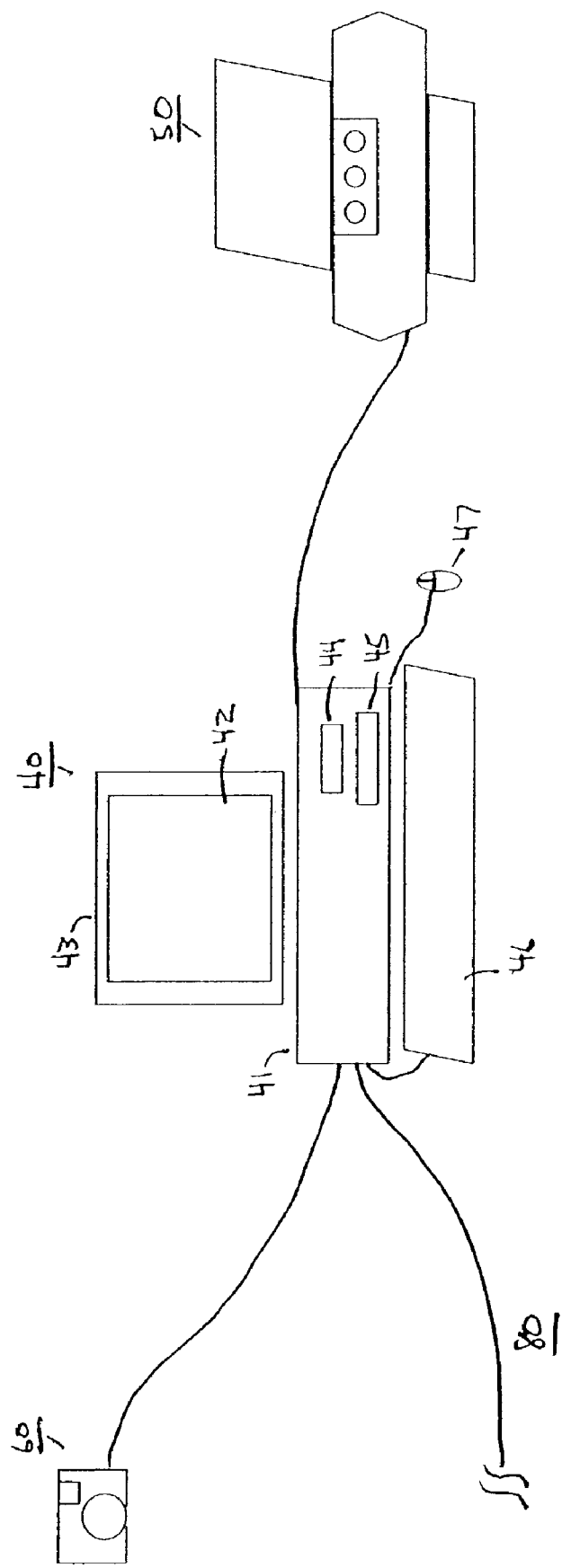
FIG. 1 is a representative view of a computing environment in which the present invention may be implemented according to one embodiment of the invention.

Turning to FIG. 1, a computing environment is shown in which one embodiment of the present invention may be practiced. Of course, it should be appreciated that the present invention can be implemented in other ways, such as in other types of devices and in other processes. The computing environment in FIG. 1 includes computing equipment, peripherals and digital devices which may be used in connection with the practice of the present invention. Computing equipment 40 includes host processor 41 which comprises a personal computer (hereinafter "PC"), preferably an IBM PC-compatible computer having a windowing environment such as Microsoft Windows 95, Windows 98 or Windows NT, although it may be a Macintosh or a non-windows-based computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a printer, preferably a color bubble jet printer, which forms color images on a recording medium such as paper or transparencies or the like. The invention is usable with other printers, however, so long as the printer is capable of being interfaced to computing equipment 40. In addition, digital camera 60 is depicted and can be used to transfer color image data corresponding to one or more images to computing equipment 40. Of course, computing equipment 40 may acquire digital image data from other sources such as a scanner (not shown) or from a local area network or the Internet via network interface bus 80.

Figure 2:
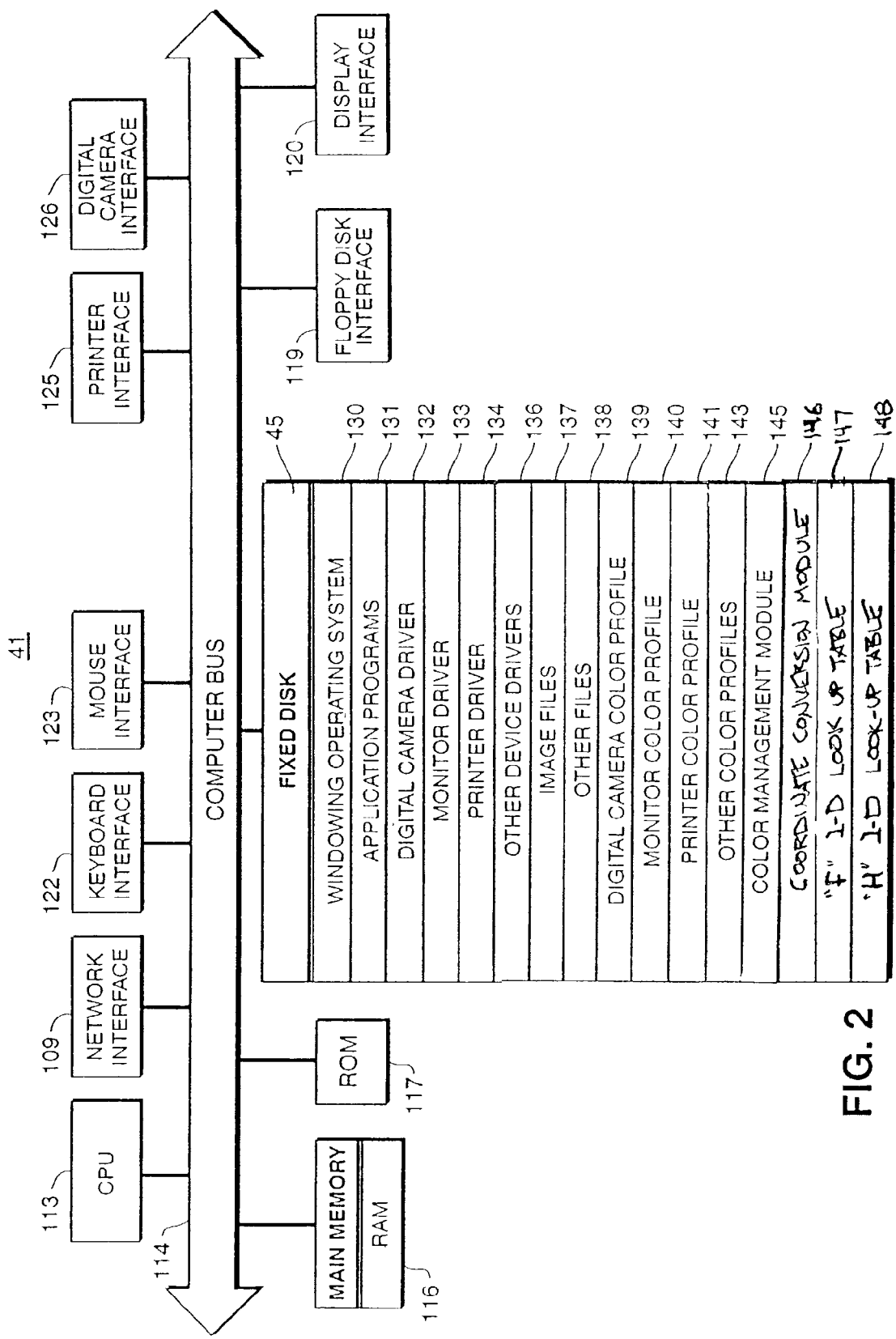
FIG. 2 is a detailed block diagram showing the internal architecture of the computer shown in FIG. 1.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as main memory, read only memory (ROM) 117, floppy disk interface 119, display interface 120 to monitor 43, keyboard interface 122 to keyboard 46, mouse interface 123 to pointing device 47, printer interface 125 to printer 50, and digital camera interface 126 to digital camera 60.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45, another storage device, or some other source such as a network, into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps which use or alter the data.

As also shown in FIG. 2, fixed disk 45 contains operating system 130, which is preferably a windowing operating system although other operating systems may be used, application programs 131, such as image processing applications that include a color management module, and plural device drivers, including a digital camera driver 132, monitor driver 133, printer driver 134 and other device drivers 136. Fixed disk 45 also includes image files 137, other files 138, digital camera color profile 139 for digital camera 60, monitor color profile 140 for monitor 43, printer color profile 141 for printer 50 and other color profiles 143 for other devices and peripherals (not shown). Also provided on fixed disk 45 are color management module 145 which provides conventional color management functions, and coordinate conversion module 146 which is used to implement a preferred embodiment of the present invention. The functional steps of coordinate conversion module 146 are preferably implemented in the form of computer-executable process steps, although the functional steps of coordinate conversion module 146 may be alternatively integrated into an device driver, such as printer driver 134, or into an application program for performing processing of color image data, such as one of application programs 131. Also included on fixed disk 45 are f(γ) one-dimensional look-up table (LUT) 147 and H(γ) one-dimensional look-up table (LUT) 148, which are used to perform coordinate conversion of color image data according to a preferred embodiment of the present invention. The functionality of coordinate conversion module 146, f(γ) one-dimensional look-up table (LUT) 147 and H(γ) one-dimensional look-up table (LUT) 148 is discussed in more detail below.

Figure 3:
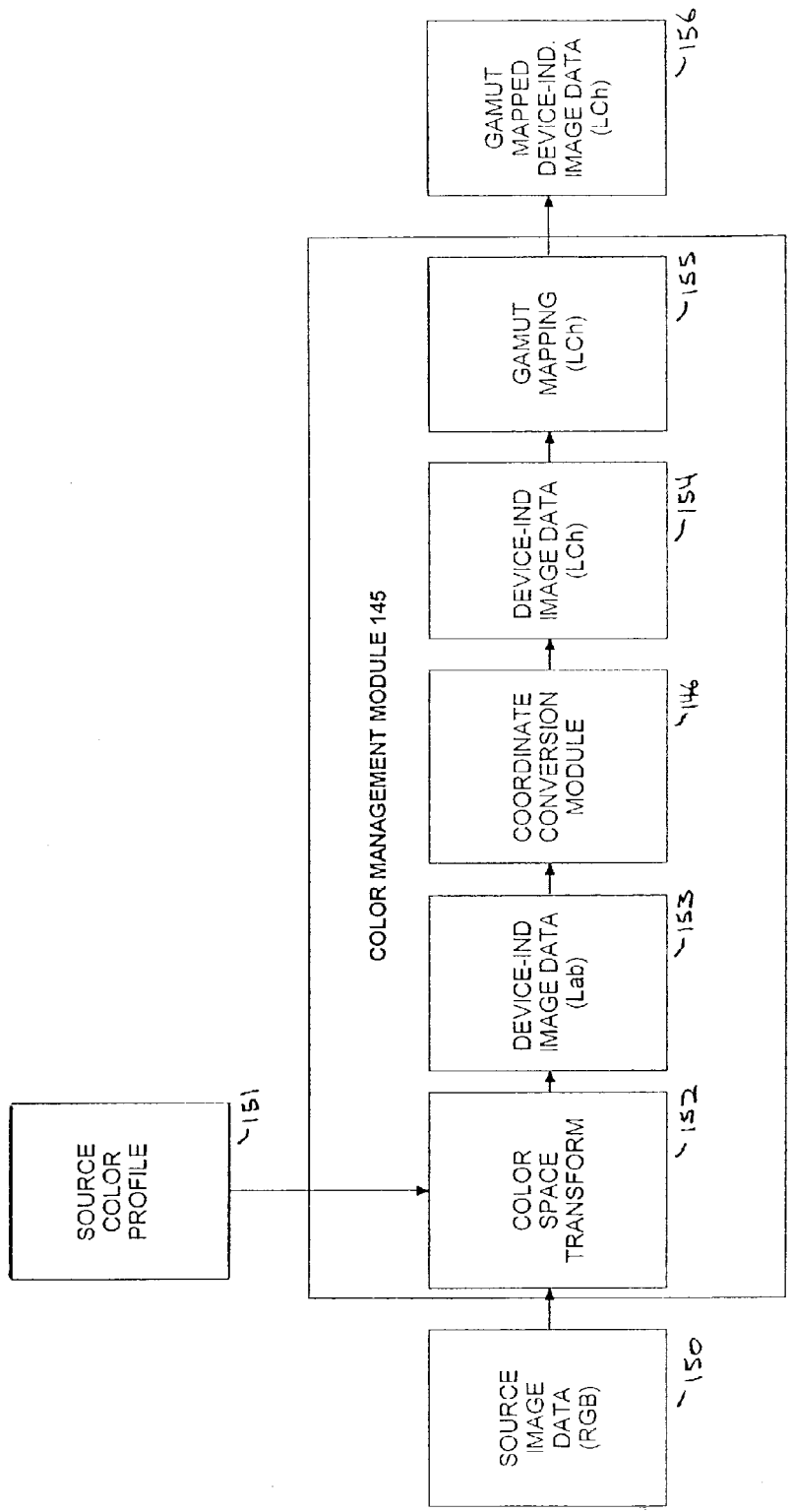
FIG. 3 is a block diagram for explaining the functionality of a color management module according to one embodiment of the invention.

FIG. 3 depicts the functionality of a color management module according to a preferred embodiment of the invention in which coordinates of color image data are quickly and efficiently converted through the use of one-dimensional look-up tables. As seen in FIG. 3, color management module 145 is used to perform gamut-mapping on source image data 150 to obtain gamut-mapped device-independent image data 156. Turning to FIG. 3, source image data 150 is provided as input to color management module 145 of fixed disk 45 in computing equipment 40. Source image data 150 may be obtained from any number of sources, such as monitor 43, digital camera 60, a scanner (not shown), or the Internet via connection 80. As shown in the example depicted in FIG. 3, source image data 151 is in RGB color space in which each pixel of an image is represented by values for red, green and blue colors, respectively.

Color management module 145 obtains color space transform 152 from source color profile 151 which corresponds to the source device from which source image data 150 was obtained. For example, if source image data 150 is obtained from monitor 43, then monitor color profile 140 is used as source color profile 151. Typically, a standardized color profile for a given device contains a transform, such as a matrix or look-up table, which describes the transformation of color image data from the color space of the given device to a device-independent color space. For example, in the case that source image data 151 is obtained from monitor 43, then monitor color profile 140 contains a color space transform for converting from RGB, which is the color space of the monitor, to CIELab, which is a standardized device-independent color space. Color space transform 152 from source color profile 152 therefore allows source image data 150 to be converted from RGB to device-independent color space CIELab so that source image data 151 can then be converted into the color space of another output device, such as the CMYK color space for output on printer 50.

Color management module 145 performs gamut mapping in order to map source image data 151 into the color gamut for a given output device, such as for printer 50. The color gamut of a given device is generally a description of the outer limits of color reproduction capabilities of a given device. For example, printer 50 may not have the capability to produce a printed image having a light green color. Accordingly, color management module 145 uses the gamut boundary description for printer 50, usually obtained from a corresponding color profile such as printer color profile 141, to compress the range of light green colors for the pixels of source image data 151 into the gamut boundary for printer 50. In this manner, printer 50 can print an image corresponding to source image data 151 in which the range of colors are represented to the best capability of printer 50.

Returning to FIG. 3, color space transform 152 operates on source image data 151 to obtain device-independent image data 153 which is preferably in the CIELab color space, although other known device-independent color space models can be used. Each pixel image data for CIELab color space is represented by values for luminance (L), redness-greenness (a), and blueness-yellowness (b), which together define rectangular coordinates for a three-dimensional color space. As mentioned above, most gamut-mapping techniques are performed on color image data that is already in a polar (cylindrical) coordinate system, such as CIELCh, instead of in a rectangular coordinate system, such as CIELab. In general, CIELCh is the same color space as CIELab, except that CIELCh defines each pixel by using polar coordinates for luminance (L), chroma (C) and hue (h). The relationship between the CIELab rectangular coordinates and the CIELCh polar coordinates is described in more detail below with respect to FIG. 4. Based on the foregoing, it is typically necessary for color management module 145 to convert source image data 151 into polar coordinates, such as CIELCh, before performing gamut mapping.

In FIG. 3, color management module 145 performs this conversion by using coordinate conversion module 146 in order to obtain device-independent image data 154 in CIELCh coordinates. Coordinate conversion module 146 is used in a preferred embodiment of the present invention and its functionality is described in more detail below. Device-independent image data 154 is then subjected to gamut mapping 155 based on a gamut boundary descriptor (not shown), such as a gamut boundary descriptor corresponding to printer 50, in order to obtain gamut-mapped device-independent image data 156. It should be appreciated that gamut-mapped device-independent image data 156 is still in CIELCh color space and therefore will typically be transformed to the color space of an output device, such as CMYK color space for printer 50, using a transform obtained from the color profile that corresponds to the output device, such as printer color profile 141 for printer 50. This last transformation is not particularly relevant to the present invention, and is therefore not shown in color management module 145 of FIG. 3. The present invention is generally concerned with the technique for converting from rectangular coordinates to polar (cylindrical) coordinates in coordinate conversion module 146, as discussed more fully below.

Figure 4:
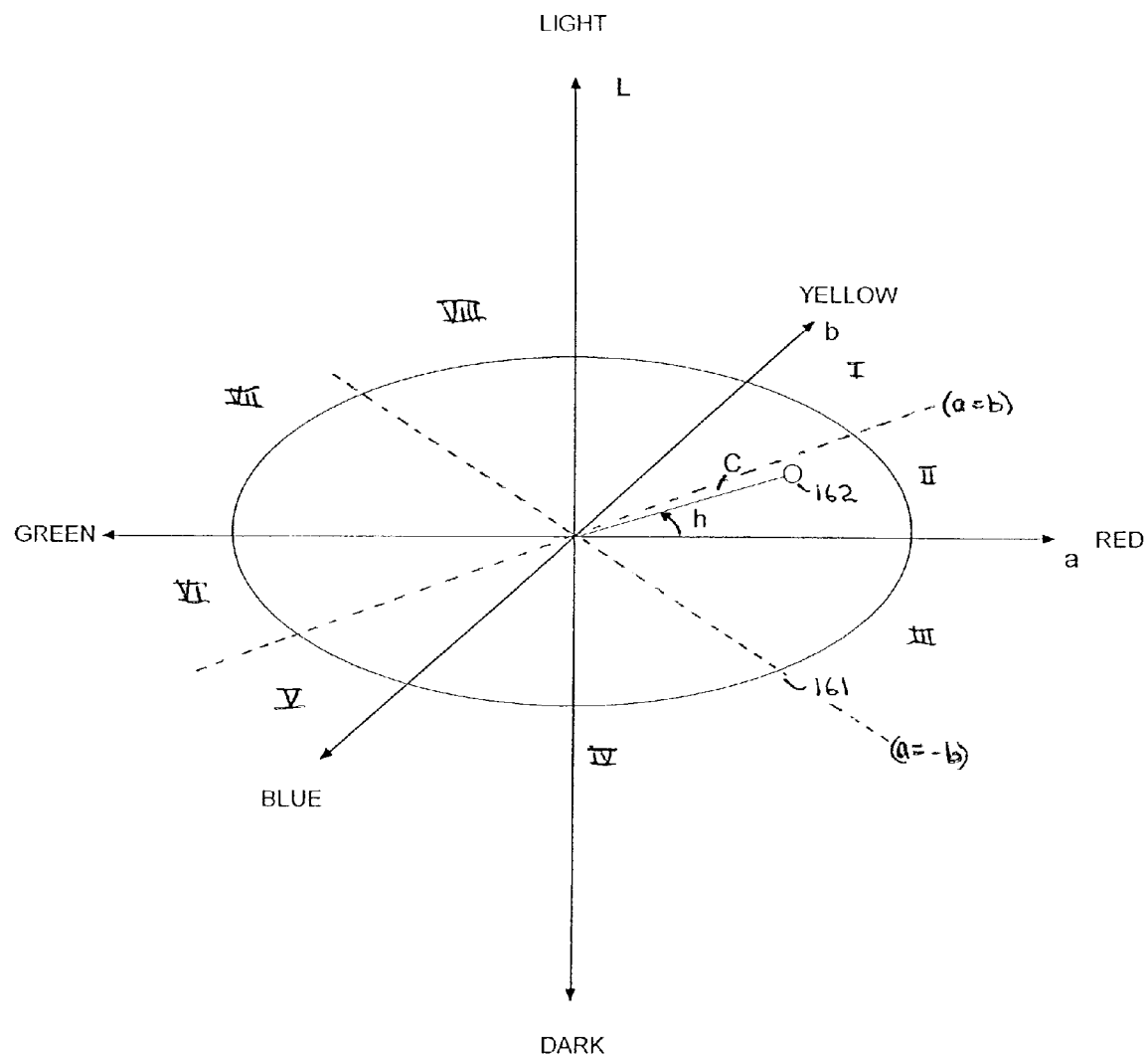
FIG. 4 is a diagram for illustrating Lab and LCh color coordinates.

FIG. 4 depicts a color space having Lab rectangular coordinates, and also having LCh polar coordinates. As seen in FIG. 4, the three-dimensional color space is defined in rectangular coordinates by the L axis for luminance from dark to light, the a axis for redness-greenness, and the b axis for blueness-yellowness. In this manner, the color of a given image pixel, such as pixel 162, is defined on a-b plane 161 depending on the values for a and b, and the lightness of the image pixel is defined by the value of L. The four quadrants on a-b plane 161 are defined by the a and b axes. These four quadrants are further broken into octants I to VIII by the lines a=b and a=(−b). As mentioned above, LCh depicts the same location of pixel 162 in the color space of Lab, except in polar coordinates. The L value is the same in LCh as in Lab and is used to depict lightness. The C value is the length of the diagonal from the center of a-b plane 161 (e.g. a=0, b=0) to the given pixel, such as pixel 162. The value of h represents the hue angle in degrees measured counterclockwise from the positive a axis (red). In this manner the polar coordinates C and h define the color a pixel 162 in the a-b plane and L represents its lightness. Pixel 162 in FIG. 4 has an L value of 0 for sake of simplicity, since L is the same in LCh as in Lab coordinates.

As mentioned above, the conversion from rectangular coordinates Lab to polar coordinates LCh is represented by the equations:
L=L $$L = L$$

$$C = \sqrt{a^2 + b^2} \qquad (1)$$

$$h = \arctan\frac{b}{a} \qquad (2)$$

Unfortunately, the implementation of equations (1) and (2) through two-dimensional look-up tables based on a and b requires a large number of entries in each two-dimensional look-up table in order to achieve acceptable accuracy. Such large two-dimensional look-up tables require significant memory and require significant processing time to manipulate. Accordingly, the present invention utilizes two one-dimensional look-up tables, one for use in calculating C, and the other for use in calculating h. Both of these one-dimensional look-up tables are indexed by a single common variable, γ, which is defined as:

$$\gamma = \left|\frac{b}{a}\right| \qquad (3)$$

By using γ, the foregoing equation (1) is redefined as:

$$\begin{aligned}
C &= (a^2 + b^2)^{1/2} & \text{Equation 4(a)} \\
&= |a| * (1.0 + \gamma^2)^{1/2} = |a| * f(\gamma), \\
&\quad \text{if } |a| \geq |b| \text{ (e.g. } 0.0 \leq \gamma \leq 1.0) \\
\text{OR} \quad &= |b| * (1.0 + (1/\gamma)^2)^{1/2} = |b| * f(1/\gamma), & \text{Equation 4(b)} \\
&\quad \text{if } |a| < |b| \text{ (e.g. } 1.0 < \gamma)
\end{aligned}$$

In this manner, a look-up table can be accessed during the calculation of C based on a single variable γ, instead of being based on two variables a and b, where γ is precalculated based on a and b. C is then calculated based on the result from the look-up table and on a or b, as the case may be. In other words, both Equations 4(a) and 4(b) use the function:

$f(\gamma^*)=(1.0+(\gamma^*)^2)^{1/2}$ where $\gamma^*=\gamma$ if $0.0 \leq \gamma \leq 1.0$ (Equation 4(a)), and where $\gamma^*=1/\gamma$ if $\gamma>1.0$ (Equation 4(b))

Note that the function "f" always operates on a value which is between 0.0 and 1.0, regardless of the relative values of a and b (e.g. γ), because in the case that γ is greater than one, the function "f" operates on 1/γ. Accordingly, a one-dimensional look-up table can be generated based on values of $(1.0+(i)^2)^{1/2}$ for values of i between 0.0 and 1.0. The one-dimensional look-up table can then be accessed based on a given value of γ, or 1/γ as the case may be, to calculate C according to either Equation 4(a) or Equation 4(b), as the case may be, depending on the value of γ.

In this manner, a one-dimensional look-up table can be used to calculate C during conversion from rectangular to polar coordinates, thereby achieving computational efficiency while still maintaining accuracy during the conversion. The determination of which one of Equations 4(a) and 4(b) to use during conversion is summarized in FIG. 6. As seen in FIG. 6, C is based on |a|*f(γ) when γ is between 0.0 and 1.0, such as in octants II, III, VI and VII of FIG. 4. C is based on |b|*f(1/γ) when γ is greater than 1.0, such as in octants I, IV, V and VIII of FIG. 4.

Similarly, the h value of LCh coordinates can be determined by using a one-dimensional look-up table for H(γ) for values of γ between 0.0 and 1.0 according to:

$H(\gamma^*)=\arctan(\gamma^*)$ where $\gamma^*=\gamma$ for $[0.0 \leq \gamma \leq 1.0]$ and where $\gamma^*=1/\gamma$ for $[\gamma>1.0]$ Based on simple trigonometry, the h value can then be calculated from H(γ*) by a simple addition or subtraction step, depending on which octant of a-b plane 161 of FIG. 4 the given image pixel resides in. In general, a-b plane 161 of FIG. 4 is divided into eight equal sections (octants), whereby the octants are defined by the four lines a=0, b=0, a=b, and a=(−b). The octant location of the image pixel is resolved by inspecting the relative values of a, b and γ. The possible calculations of h based on the relative values of a, b and γ are depicted in FIG. 7.

As seen in FIG. 7, a table is illustrated for calculation of h based on resolution of the octant of the given image pixel. For example, a given pixel may fall directly one the a or b axis, or may fall within one of octants I to VIII as seen in FIG. 4. Rows 190, 191 and 192 represent the portions of a-b plane 161 in which the value a is equal to 0, greater than 0, and less than 0, respectively. Column 193 represents the b axis which is defined by b=0. Column 194 represents portions of the a-b plane 161 when b>0 and when γ>1.0. Column 195 represents portions of the a-b plane 161 when b>0 and when γ≦1.0. Column 196 represents portions of the a-b plane 161 when b<0 and when γ>1.0. Column 197 represents portions of the a-b plane 161 when b<0 and when γ≦1.0. Accordingly, the values of a, b and γ are used to locate which one of the trigonometric equations in the table of FIG. 7 should be used to calculate the value of h based on H(γ*) where γ* is equal to either γ or 1/γ, as the case may be. These combinations of a and b define a particular portion of a-b plane 161 such as the a axis, the b axis, or one of octants I to VIII as seen in FIG. 4. For example, the values of a and b for pixel 162 of FIG. 4 are both positive, and assuming that |a| is greater than |b| such that γ is less than or equal to 1.0, then an inspection of FIG. 7 according to these values yields the equation H(γ), which is simply the arctan of γ. This position of pixel 162 corresponds to octant II in FIG. 4.

Based on the above, a one-dimensional look-up table can be generated for arctan(i) for values of i between 0.0 and 1.0. The one-dimensional look-up table can then be accessed based on γ or 1/γ, depending on the value of γ, in order to calculate h according to the appropriate trigonometric equation which is selected based on the values of a, b and γ, as depicted in FIG. 7.

Figure 5:
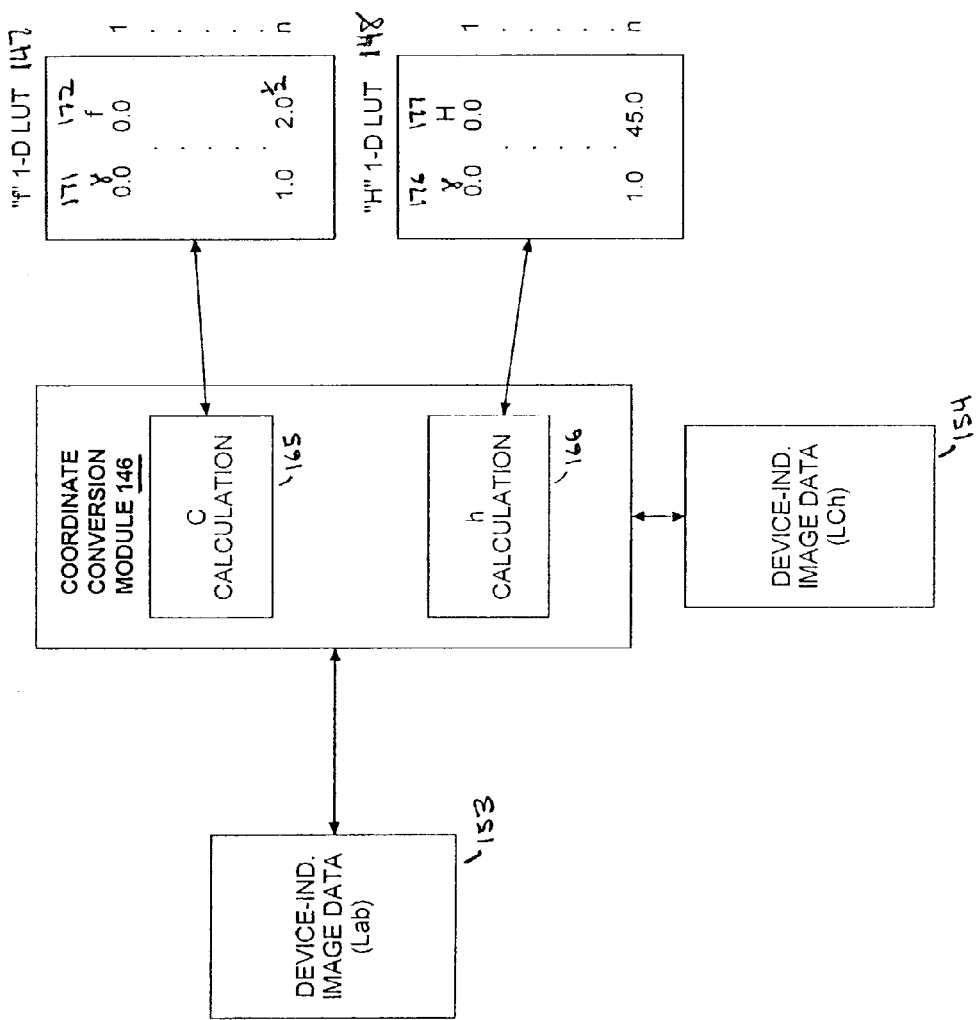
FIG. 5 is a block diagram illustrating color coordinate conversion using one-dimensional look-up tables according to one embodiment of the invention.

Turning to FIG. 5, a block diagram depicts the use of such one-dimensional look-up tables by coordinate conversion module 146 to determine the values of C and h according to one embodiment of the present invention. As seen in FIG. 5, device-independent image data 153 is in Lab coordinates, and is input to coordinate conversion module 146 in order to obtain device-independent image data 154 which is in LCh coordinates. Coordinate conversion module 146 has "C" calculation portion 165 which accesses "f" one-dimensional look-up table 147 in the determination of the C value for each image pixel. Coordinate conversion module 146 also has "h" calculation portion 166 which accesses "H" one-dimensional look-up table 148 in the determination of the h value for each image pixel.

As discussed above, "f" one-dimensional look-up table 147 is populated for f(γ*) which is represented by $(1.0+(γ*)^2)^{1/2}$ for values of γ* between 0.0 and 1.0, such that the values for f(γ*) range from 0.0 to $2.0^{1/2}$. Accordingly, where "f" one-dimensional look-up table 147 has n entries, the values for each entry i are populated according to:

$$FT[i]=f(i/(n-1))=(1.0+(i/(n-1))^2)^{1/2} \text{ where } i=0, 1, 2, \ldots (n-1)$$

Similarly, "H" one-dimensional look-up table 148 is populated for H(γ*) which is represented by arctan(γ*) for values of γ* between 0.0 and 1.0, thereby resulting in values of H(γ*) in the range of 0.0 to 45.0. Accordingly, where "H" one-dimensional look-up table 148 has n entries, the values for each entry i are populated according to:

$$HT[i]=H(i/(n-1))=\arctan(i/(n-1)) \text{ where } i=0, 1, 2, \ldots (n-1)$$

It can be appreciated that each of one-dimensional look-up tables 147 and 148 can be accessed based on the given value of γ*, which is between 0.0 and 1.0, by multiplying γ* by (n−1) to determine the nearest entry point(s) in the one dimensional look-up table. In the case where γ*(n−1) does not have a fractional component, the value of γ* falls directly on a particular entry point and the corresponding value for that entry point is returned. In the case where γ*(n−1) does have a fractional component, the value of γ* falls in between two entry points and interpolation is performed between the corresponding values for the two entry points to obtain a return value. One possible set of interpolation equations is:

$$f(γ*)=x*FT[i+1]+(1-x)*FT[i]$$

$$H(γ*)=x*HT[i+1]+(1-x)*HT[i]$$

where i is the integer portion of γ*(n−1), and where x is the fractional portion of γ*(n−1).

Figure 8:
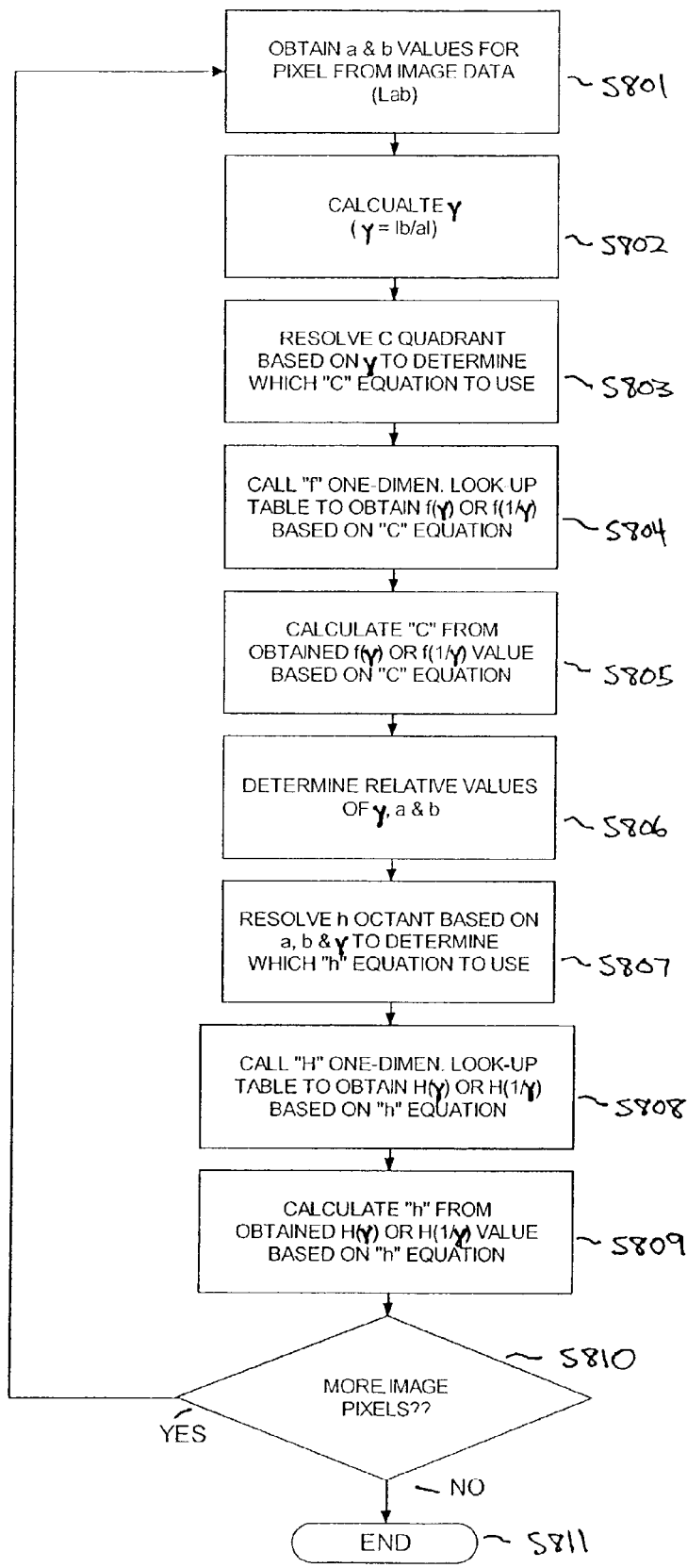
FIG. 8 is a flowchart for explaining color coordinate conversion using one-dimensional look-up tables according to one embodiment of the invention.

FIG. 8 is a flowchart for explaining the conversion of image data from Lab coordinates to LCh coordinates by coordinate conversion module 146 which uses one-dimensional look-up tables 147 and 148, in conjunction with resolving the appropriate equations for C and h according to the C quadrant and the h octant depicted in FIGS. 6 and 7. Turning to FIG. 8, the values of a and b are obtained for a pixel from the input image data, which is in Lab coordinate space (step S801). Next, in step S802, the value of γ is calculated based on an absolute value of the ratio of the obtained values of a and b. In step S803, the C quadrant is resolved based on the value of γ to determine which one of equations 181 or 185 depicted in FIG. 6 to use in order to calculate C.

The value of γ, or 1/γ as the case may be, is used to access "f" one-dimensional look-up table 147 in order to obtain f(γ), or f(1/γ) as the case may be according to the determined equation for C (step S804). In step S805, the value of C is then calculated according to the determined equation for C from step S803 based on the obtained value of f(γ), or f(1/γ) as the case may be, from step S804. In step S806, the values of a, b and γ are compared and then used in step S807 to resolve the h (hue) octant to determine which one of the trigonometric equations depicted in FIG. 7 to use in order to calculate h. The value of γ or 1/γ, as the case may be, is used to access "H" one-dimensional look-up table 148 in order to obtain H(γ) or H(1/γ), as the case may be according to the determined equation for h (step S808). In step S809, the value of h is then calculated according to the determined equation for h from step S807 based on the obtained value of H(γ) or H(1/γ), as the case may be, from step S808.

In step S810, it is determined whether more image pixel data remains to be converted for the input image data. If there is more image pixel data to be converted, flow passes to step S801 in which steps S801 to S810 are repeated. If there is no more image pixel data to be converted, flow passes to end in step S811. In this manner, one-dimensional look-up tables 147 and 148 are used to perform the conversion of image data from rectangular to polar coordinates in a computationally efficient manner without requiring the processor to perform complex mathematical calculations, and without requiring large cumbersome two-dimensional look-up tables, while still maintaining precise conversion with low error.

FIGS. 9A, 9B and 9C depicts another embodiment of the present invention in which coordinate conversion module 146 simultaneously resolves the C quadrant and the h octant in order to determine which equations to use for determining C and h, based on relative values of a and b. In general, the value of a is first inspected to determine which group of several sets of equations to consider as possibilities for the conversion of C and h. Then the value of b is inspected to select the appropriate set of equations within the determined group. In particular, FIG. 9A depicts a group of several sets of equations to consider as possibilities for the conversion of C and h when the value of a is equal to zero, such as when a pixel is on the a axis. FIG. 9B depicts a group of several sets of equations to consider as possibilities for the conversion of C and h when the value of a is greater than zero. FIG. 9C depicts a group of several sets of equations to consider as possibilities for the conversion of C and h when the value of a is less than zero.

Once the group of either FIG. 9A, 9B or 9C is determined based on the value of a, the value of b and the relative comparison between a and b determine which set of equations to use in order to calculate C and h. For example, if a is less than zero (211), then the group of equations in FIG. 9C is considered. Assuming for explanatory purposes that b is also less than zero and has an absolute value greater than the absolute value of a, then it can be seen that column 215 is accessed such that the equation for C is −b*f(a/b), and the equation for h is 270°−H(a/b). This would correspond to a pixel located in octant V of FIG. 4. In this manner, the appropriate equations are obtained simultaneously, after which one-dimensional look-up tables 147 and 148 can be utilized to carry out the calculations of C and h according to the obtained equations.

Figure 10:
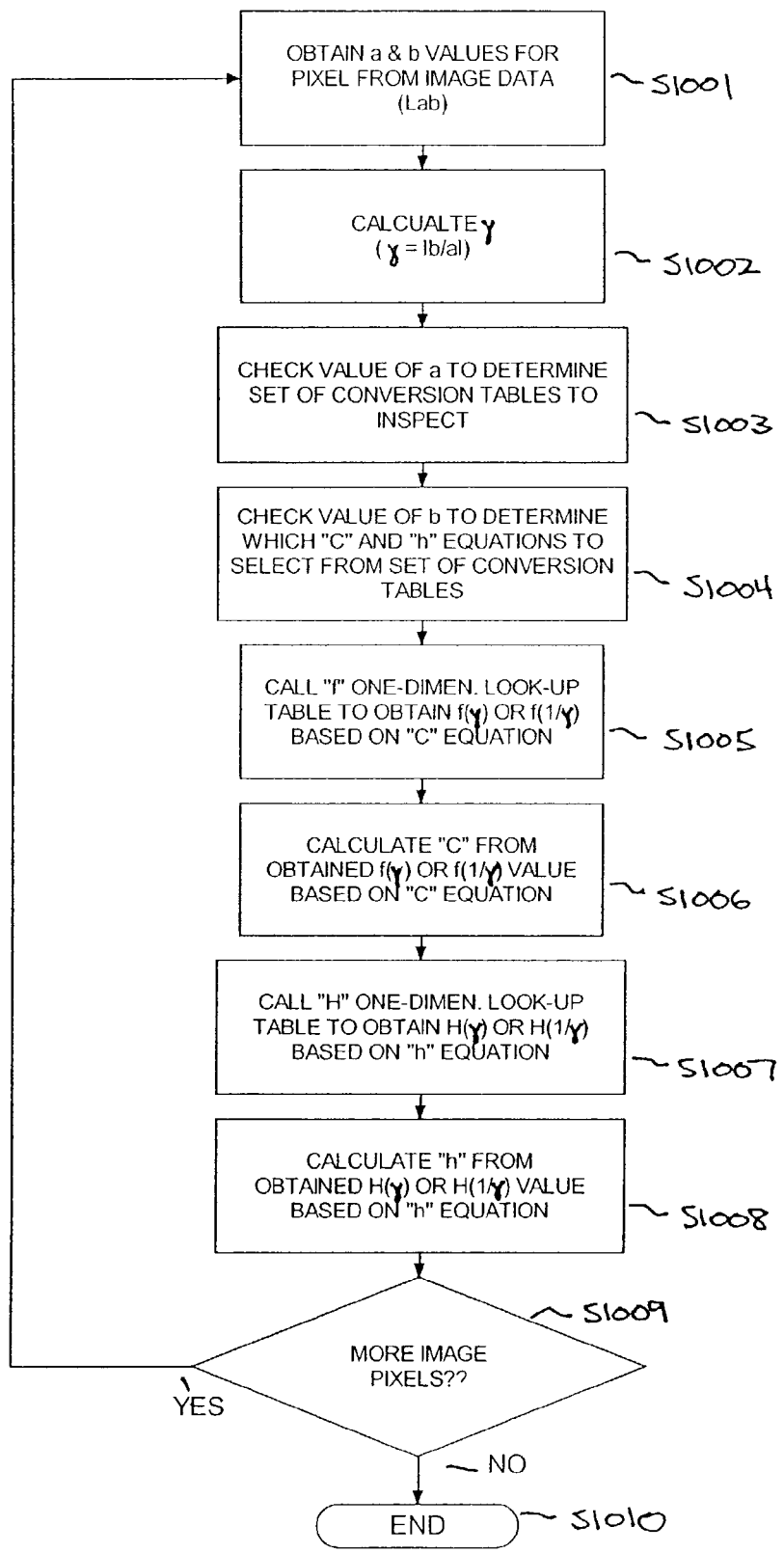
FIG. 10 is a flowchart for explaining color coordinate conversion using one-dimensional look-up tables according to another embodiment of the invention.

FIG. 10 is a flowchart for explaining the conversion of image data from Lab coordinates to LCh coordinates by coordinate conversion module 146 according to the embodiment depicted in FIGS. 9A, 9B and 9C. Turning to FIG. 10, the values of a and b are obtained for a pixel from the input image data, which is in Lab coordinate space (step S1001). Next, in step S1002, the value of γ is calculated based on the absolute value of the ratio of the obtained values of a and b. In step S1003, the value of a is checked to select a group of equations sets to consider, as illustrated in FIGS. 9A, 9B and 9C. Next, the value of b is checked, along with b's relative value to a, to determine which equation set in the selected group from step S1003 is the appropriate equation set to use for calculating the values of C and h (step S1004).

The value of γ, or 1/γ as the case may be, is used to access "f" one-dimensional look-up table 147 in order to obtain f(γ), or f(1/γ) as the case may be according to the determined equation for C (step S1005). In step S1006, the value of C is then calculated according to the determined equation for C from step S1004 based on the obtained value of obtain f(γ), or f(1/γ) as the case may be, from step S1005. In step S1007, the value of γ or 1/γ, as the case maybe, is used to access "H" one-dimensional look-up table 148 in order to obtain H(γ) or H(1/γ), as the case may be according to the determined equation for h. In step S1008, the value of h is then calculated according to the determined equation for h from step S1004 based on the obtained value of H(γ) or H(1/γ), as the case may be, from step S1007.

In step S1009, it is determined whether more image pixel data remains to be converted for the input image data. If there is more image pixel data to be converted, flow passes to step S1001 in which steps S1001 to S1009 are repeated. If there is no more image pixel data to be converted, flow passes to end in step S1010. In this manner, one-dimensional look-up tables 147 and 148 are used to perform the conversion of image data from rectangular to polar coordinates in a computationally efficient manner without requiring the processor to perform complex mathematical calculations, and without requiring large cumbersome two-dimensional look-up tables, while still maintaining precise conversion with low error.

It can be appreciated that the invention may be implemented in a manner other than the embodiments described above. For example, the conversion of image data using one-dimensional look-up tables according to the present invention may be directly implemented in a device driver, such as a printer driver or scanner driver, or may be directly implemented in embedded software of an image device, such as a printer, scanner or camera. In addition, the functional steps described above for the conversion of image data using one-dimensional look-up tables do not necessarily have to be performed by a coordinate conversion module, but could be coded directly within color management software, or another application or program which operates in image data.

Although the invention has been described with particular illustrative embodiments, the invention is not limited to the above-described embodiments and various changes and modifications may be made by those of ordinary skill in the art without departing from the spirit and scope of the invention.

What is claimed is:

1. Method of converting a color data value (a, b) from rectangular color coordinates to a corresponding color data value (C, h) in polar coordinates comprising:
   calculating a ratio γ based on the absolute value of the ratio of b and a;
   accessing a first one-dimensional look-up table implementing the values ($\sqrt{1+\gamma^2}$) on the range of [0 to 1] to obtain a first look-up value;
   resolving the diagonal quadrant for C based on the ratio γ;
   calculating C based on the resolved diagonal quadrant and the first look-up value;
   accessing a second one-dimensional look-up table implementing the values arctan (γ) on the range [0 to 1] to obtain a second look-up value;
   resolving the octant for h based on the values of a and b and based on the ratio γ of a and b; and
   calculating h based on the resolved octant and the second look-up value.

2. The method according to claim 1, wherein the ratio γ of a and b is calculated consistently regardless of the relative values of a and b.

3. The method according to claim 2, wherein said steps of accessing the first and second one-dimensional look-up tables include the step of accessing the look-up tables based on the value of γ or based on the value of 1/γ in dependence on the value of γ.

4. The method according to claim 1, wherein said step of calculating the ratio of γ comprises the step of calculating γ=a/b or γ=b/a in dependence on the relative values of b and a.

5. The method according to claim 4, wherein said steps of accessing the first and second one-dimensional look-up tables comprises the step of accessing the tables based on γ without regard to the relative values of a and b.

6. The method according to claim 5, wherein said step of resolving the diagonal quadrant comprises the step of comparing values of a and b.

7. The method according to claim 5, wherein said step of resolving the octant comprises the step of comparing the values of a and b and comparing the values of a and b and γ.

8. The method according to claim 1, further comprising the step of interpolating values obtained from said steps of calculating C and calculating h.

9. An apparatus for converting a color data value (a, b) from rectangular coordinates to a corresponding color data value (C, h) in polar coordinates, comprising:
   a program memory for storing process steps executable to perform a method according to any of claims 1 to 8; and
   a processor for executing the process steps stored in said program memory.

10. Computer-executable process steps stored on a computer readable medium, said computer-executable process steps for converting a color data value (a, b) from rectangular coordinates to a corresponding color data value (C, h) in polar coordinates, said computer-executable process steps comprising process steps executable to perform a method according to any of claims 1 to 8.

11. A computer-readable medium which stores computer-executable process steps, the computer-executable process steps for converting a color data value (a, b) from rectangular coordinates to a corresponding color data value (C, h) in polar coordinates, said computer-executable process steps comprising process steps executable to perform a method according to any of claims 1 to 8.

* * * * *